United States Patent
Downey (12)

(10) Patent No.: US 11,212,197 B1
(45) Date of Patent: Dec. 28, 2021

(54) SYSTEMS AND METHODS FOR CLOUD-ENABLED DATA SERVICES

(71) Applicant: Congruity 360, LLC, Pembroke, MA (US)

(72) Inventor: John Downey, New York, NY (US)

(73) Assignee: Congruity 360, LLC, Pembroke, MA (US)

(*) Notice: Subject to any disclaimer, the term of this patent is extended or adjusted under 35 U.S.C. 154(b) by 0 days.

(21) Appl. No.: 16/134,682

(22) Filed: Sep. 18, 2018

(51) Int. Cl.
*H04L 29/08* (2006.01)
*H04L 12/24* (2006.01)
*G06F 8/61* (2018.01)
*G06F 3/0484* (2013.01)
*G06F 3/0481* (2013.01)
*G06F 21/45* (2013.01)
*H04L 29/06* (2006.01)
*G06F 9/455* (2018.01)
*G06Q 30/06* (2012.01)

(52) U.S. Cl.
CPC ...... *H04L 41/5051* (2013.01); *G06F 3/04817* (2013.01); *G06F 3/04842* (2013.01); *G06F 8/61* (2013.01); *G06F 9/45558* (2013.01); *G06F 21/45* (2013.01); *G06Q 30/0641* (2013.01); *H04L 41/5054* (2013.01); *H04L 63/10* (2013.01); *H04L 67/16* (2013.01); *H04L 67/34* (2013.01); *G06F 2009/45562* (2013.01)

(58) Field of Classification Search
CPC . H04L 41/5051; H04L 41/5054; H04L 63/10; H04L 67/16; H04L 67/34; G06F 3/04817; G06F 3/04842; G06F 8/61; G06F 9/45558; G06F 21/45; G06Q 30/0641
USPC .......................................................... 709/206
See application file for complete search history.

(56) References Cited

U.S. PATENT DOCUMENTS

2012/0089971 A1* 4/2012 Williams .................. G06F 8/61
717/167
2012/0158821 A1* 6/2012 Barros .................. G06F 16/254
709/203

* cited by examiner

*Primary Examiner* — Glenford J Madamba
(74) *Attorney, Agent, or Firm* — FisherBroyles, LLP; W. Scott Harders

(57) ABSTRACT

Systems and methods are disclosed for permitting users to select and implement data management services. Systems and methods receive a user selection from a user interface representation of a cloud marketplace. The user selection can include a use case specific instruction relating to the user selection representing a particular one of the plurality of cloud-enabled services. Systems and methods obtain service set up data from the user corresponding to particular aspects of the user selection. Based on the received user selection and the service set up data, a computer-executable file is created for a user identified computer, where the computer executable file, upon execution on the user identified computer, establishes a data path between a user data location and a cloud-enabled service corresponding to the user selection. Following commencement of the cloud-enabled service, the system and method provide data including usage and billing to users, cloud-enabled service providers and marketplaces.

17 Claims, 5 Drawing Sheets

SYSTEMS AND METHODS FOR CLOUD-ENABLED DATA SERVICES

TECHNICAL FIELD

This disclosure relates generally to computer-implemented methods and systems and more particularly relates to systems and methods for cloud-enabled data services although the teachings find application in terrestrial, hybrid, pure cloud, and cloud-native based environments.

SUMMARY

There are many vendors of data management services offering a spectrum of services including back-up, recovery, archive, migration, compliance including GPDR and other services, where each service is often further stratified as to specific hardware, software, database, storage media and combinations thereof to name a few.

Cloud-enabled marketplaces have also been maturing at a rapid pace but these marketplaces are still cumbersome to navigate, the particular services desired can be difficult to locate and service comparisons are extremely difficult to make. Moreover, once a specific vendor is found additional challenges face a user when attempting to implement the purchased services.

For example, there are thousands of listings in the Amazon Web Services (AWS) Marketplace. A customer has to conduct significant research which is generally vendor and product oriented rather than task oriented or "use case" driven. The listings generally lack granular, use case specificity and instead are product focused. In addition, many of these vendors lack significant experience, are Cnewer companies without track records, and/or are not well known, although vendors with more market tenure continue to enter into Marketplace listings.

Systems and methods are disclosed herein for enhancing selection, purchase, install and maintenance of cloud-enabled data management services. An exemplary method performed by a computing device involves permitting users to select and implement data management services. The method includes receiving a user selection from a user interface representation of a cloud marketplace, where the user selection includes a use case specific instruction relating to the user selection representing a particular one of a plurality of cloud-enabled services. The method further includes obtaining service set up data from the user where the service set up data corresponds to particular aspects of the user selection. The method further includes based on the received user selection and the service set up data, creating a computer-executable file for a user identified computer, where the computer executable file, upon execution on the user identified computer, establishes a data path between a user data location and a cloud-enabled service corresponding to the user selection.

As an example a customer can browse for and implement use case based solutions such as "Backup a file server running on AWS EC2" or "SQL archive Google Cloud Coldline." Upon receipt of the user selection, the method obtains service set up data pertaining to the desired implementation. To begin the service, a computer-executable file is created to be downloaded to a user identified computer. In instances, upon execution of the file, a data path is established between a user data location and a cloud-enabled service provider and the service is rendered. The method continues providing data relative to the service including usage statistics, billing, dash-board or other reporting functions, and the like.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
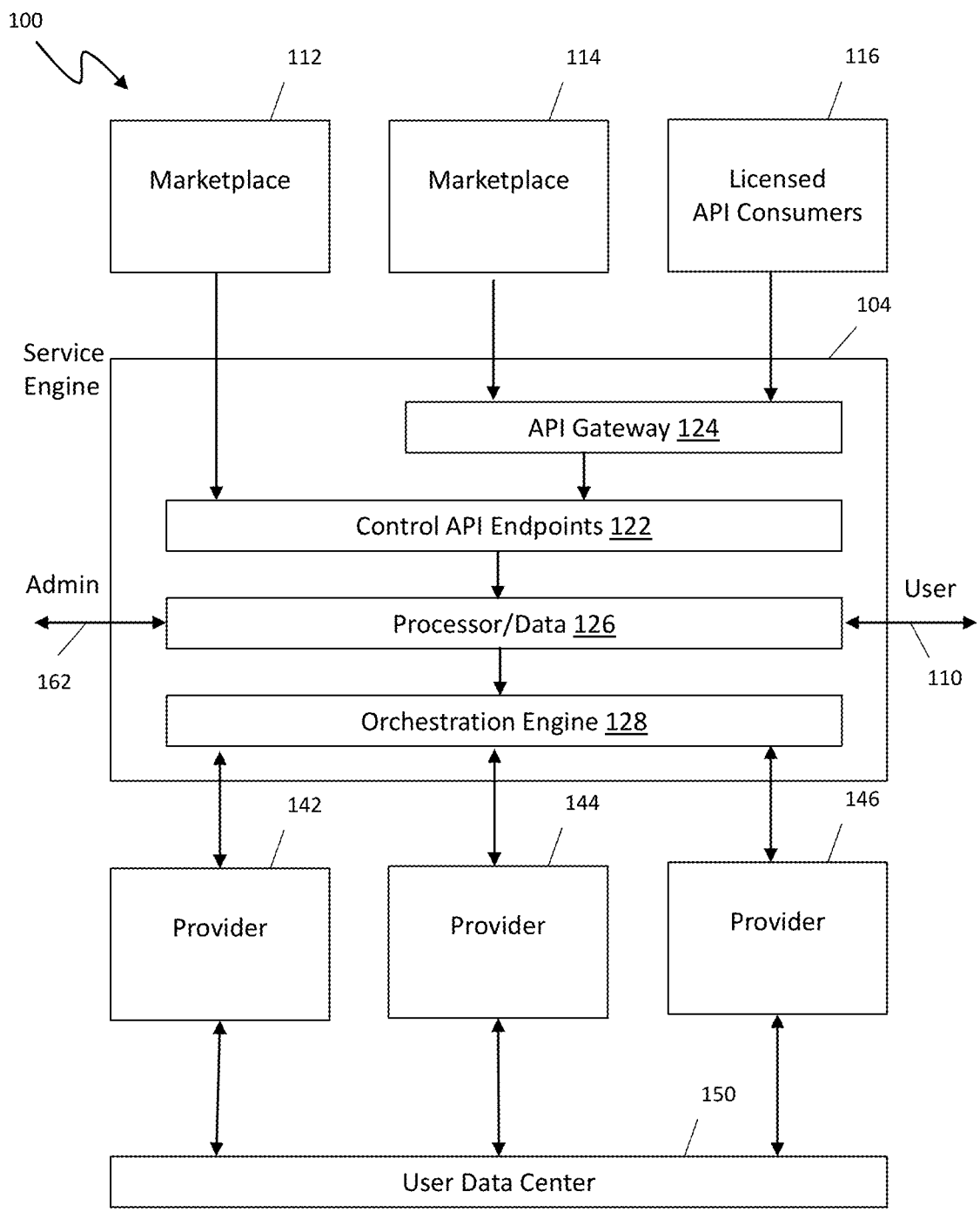
FIG. 1 is a diagram of an environment in which one or more techniques of the invention can be practiced.

This disclosure describes systems and methods that enable data custodians, such as businesses, financial institutions, professional firms, and the like to select and implement cloud-enabled data management services. Currently, there are channel entities that sell data management services such as value added resellers (for example, Presidio); managed service providers (for example, Rackspace); and cloud systems integrators (Accenture or $2^{nd}$ Watch) having varying levels of cloud-enabled offerings.

Data custodians, however, are challenged executing on terrestrial, hybrid, or pure cloud-enabled strategies. Complex vendor offerings, implementation roadblocks, security concerns and legacy procurement models all result in inefficiency, confusion, and slower time to market.

As one specific example, many popular data storage and data management vendors that data custodian customers currently use lack hybrid and multi-cloud capabilities.

Embodiments of the invention disclosed here address one or more of the issues of prior adoption and maintenance of cloud-enabled data management services by presenting data custodians with "use case" service offerings specific to their immediate need. For example, a data custodian may require cloud-enabled data archival services for a common database or data infrastructure such as SQL. The system presents use case tiles, for instance "SQL archive Amazon Glacier," "SQL archive Google Cloud Coldline" and "SQL archive Microsoft Azure Archive Storage" and permits the custodian to compare features, costs and the like before making a selection. The systems and methods then receive instructions specific to the selected use case. For example, a service engine interface between the marketplace and the identified cloud-enabled service provider receives API calls to establish next steps related to onboarding a new data tenant and a processor sends out an email with links and credentials to the customer to access to the selected service. In another example, service engine interface receives API calls through an API Gateway to format and provide a layer of security. The systems and methods create an executable file to be loaded or installed on the data custodian source computer(s) and establish a path between the source location and the cloud-enabled service.

Thus, techniques of the invention described herein provide better and simplified ways to select, implement and/or maintain a cloud-enabled data management system. Rather than the data custodian having to select and then implement a cloud-enabled service at a source location, the custodian merely clicks on the desired use case solution and the system and method creates implementation code based on source location data and cloud-enabled service requirements. In one embodiment, data custodian security credentials are used by the system and method and later revoked once a data path has been established between the source data and the cloud-enabled service vendor. In another embodiment, an appliance is created and inserted into data custodian or source data machine that can become a network security proxy remaining on the custodian system.

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

"Cloud-enabled," as described herein, refers to a service that is implemented partially or entirely through internet or private data channels. Examples include terrestrial, hybrid-cloud, cloud-adapted and cloud-native service provision.

"Marketplace," as described herein, refers to a cloud-enabled or internet accessible selection of data services, providers, solutions, and value added resellers of 3$d$ party services. Examples of marketplaces include Orbitera®, G Suite Marketplace, Microsoft® Azure Marketplace, AWS Marketplace, among others now in use as well as others to come.

"Use case," as described herein, refers to a business requirement dependent on or driven by an application, operating system, hypervisor and/or cloud involved. Examples are provided herein.

FIG. 1 is a diagram of an environment 100 in which one or more embodiments of the present disclosure can be practiced. The environment 100 includes a service engine 104 that facilitates interactions between marketplaces 112, 114, and licensed API consumers 116 on one hand, and providers 142, 144, 146 of cloud-enabled services on the other. Providers may include commercially available services such as Commvault, AWS, Azure, Cloudforms and the like as well as services yet to be introduced. In one embodiment, a specific marketplace 112 may provide API calls to service engine 104, directly into control API endpoints 122. For example, the commercially available Orbitera marketplace is currently being implemented for providing direct control API endpoints 122 as a trusted interface. In other embodiments, other marketplaces or licensed API consumers send API calls to service engine 104 into an API gateway 124 for translation or as an added layer of security. In either case, the control API endpoints 122 provide modularity so that many different marketplaces can be implemented either directly or through the gateway 124. API calls include data representative of a particular use-case selected by a data custodian user interacting with the marketplace. In other embodiments, processor 126, presents individual use cases as icons on a stand-alone marketplace.

Specific exemplary attributes of a processor 126 will be discussed below in connection with FIG. 2. The processor 126 communicates with an orchestration engine 128 that provides a layer to allow the processor 126 to communicate with any of the varied providers 142, 144, 146 and establish services between a user data center 150 and a specific cloud-enabled service provider, for example Commvault. Processor 126 also includes a communication path 162 for system administration. Administration may include various system maintenance, dash-board and other functions such as the ability to modify users, override system defaults and configurations, debug certain customer problems and in general to easily control the system and method. Similarly, user interaction path 110 additionally provides access to the end user's dashboard which includes the ability for the user to monitor their services, make changes, view usage and billing information and so on. Such data is collected by the system and method, stored persistently in the database, and made available to users as they log in and access that data via custom dashboards.

Figure 2:
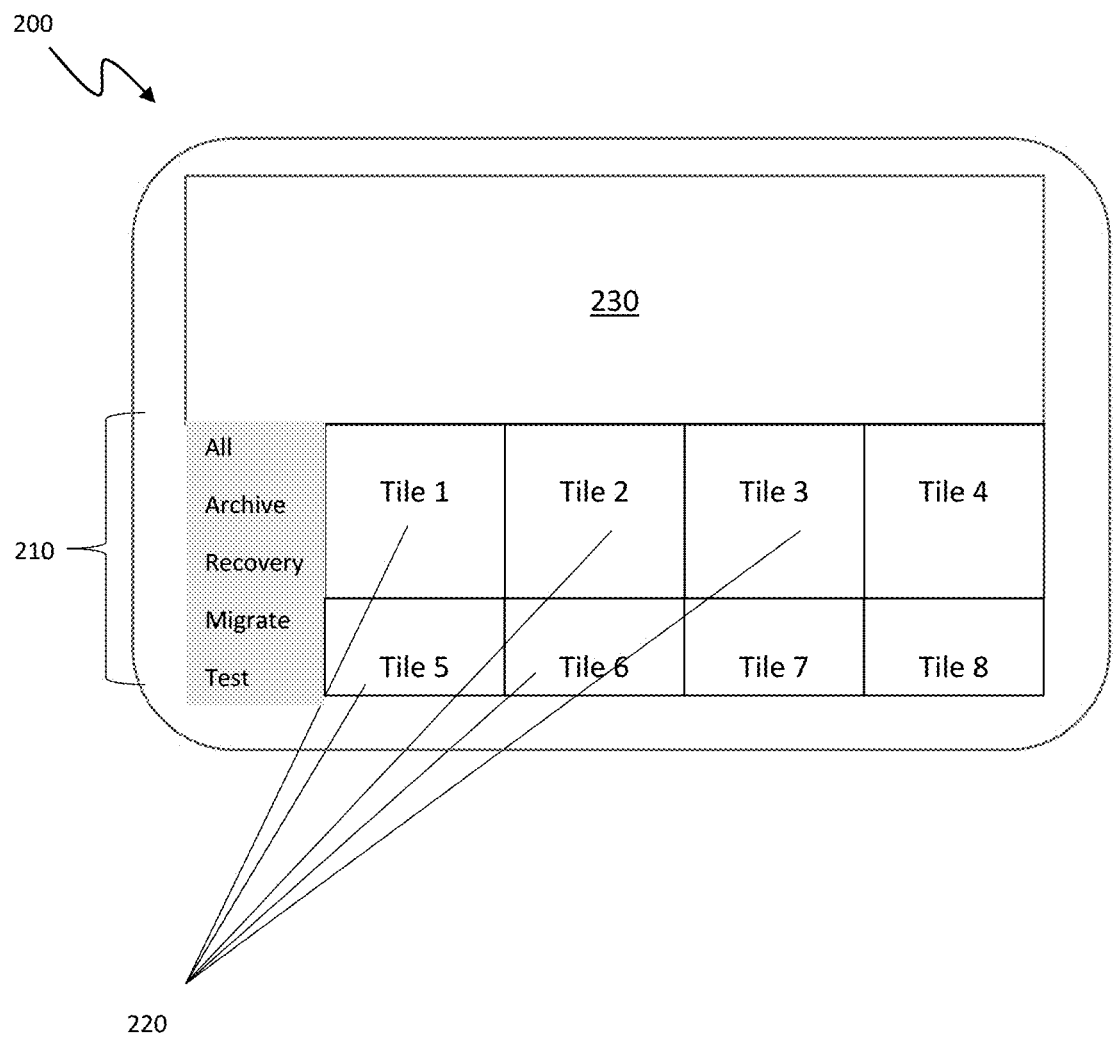
FIG. 2 illustrates a user interface and use case tiles.

With reference now to FIG. 2, an exemplary user interface 200 of a marketplace is shown. The display includes a selection area 210 for types of services available from the marketplace, for example, data archive, disaster recovery, migration, compliance and the like. When a service type is selected, the system displays tiles 220 with use case services and providers. Upon selection of one or more tiles, the user is presented with pricing and other options available from that tile.

Figure 3:
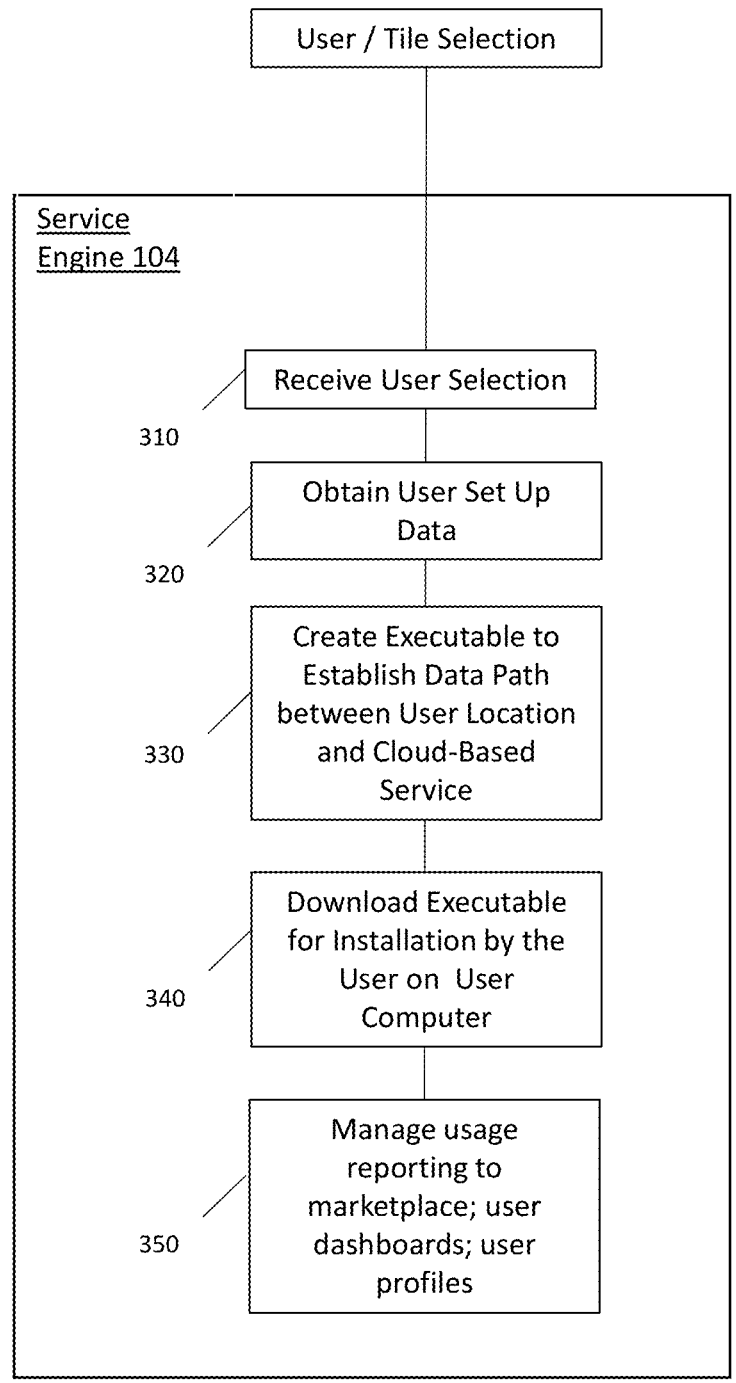
FIG. 3 illustrates an implementation of a service engine.

With reference now to FIG. 3, an embodiment of functionality provided by a service engine 104 is shown. As discussed, a plurality of user selectable tiles are displayed for user interaction, review and comparison on a marketplace. The tiles are presented as use case solutions for specific data custodian needs. For example, "Archive MS Office 365 Exchange to Azure Cool Blob," or "Backup Windows File System to Amazon Glacier." The data custodian needs only know the data need, e.g. back-up an Exchange server and the solution is ready to implement. The system receives a user selection, 310, including the service need and the cloud-enabled service provider selected by the tile selection to implement the service. The system begins collecting user set-up data 320 including, but not limited to billing information, service term, service level, user data location and passwords, and the like. The system creates a computer-executable file 330 to establish a data path between a desired user location, such as a data center or centers where the service is to be applied and the cloud-enabled service. The system causes the computer-executable file to be downloaded for installation 340 on the data custodian's computer or at the user location. When the data custodian runs the computer-executable file the data path is established, and the cloud-enabled service may begin. Once the cloud-enabled service is begun, the system and method provide additional services 350 such as service usage metric reporting to the marketplace; creating, updating and providing customer dashboards and operations dashboards; establishing customer profiles and the like.

Figure 4:
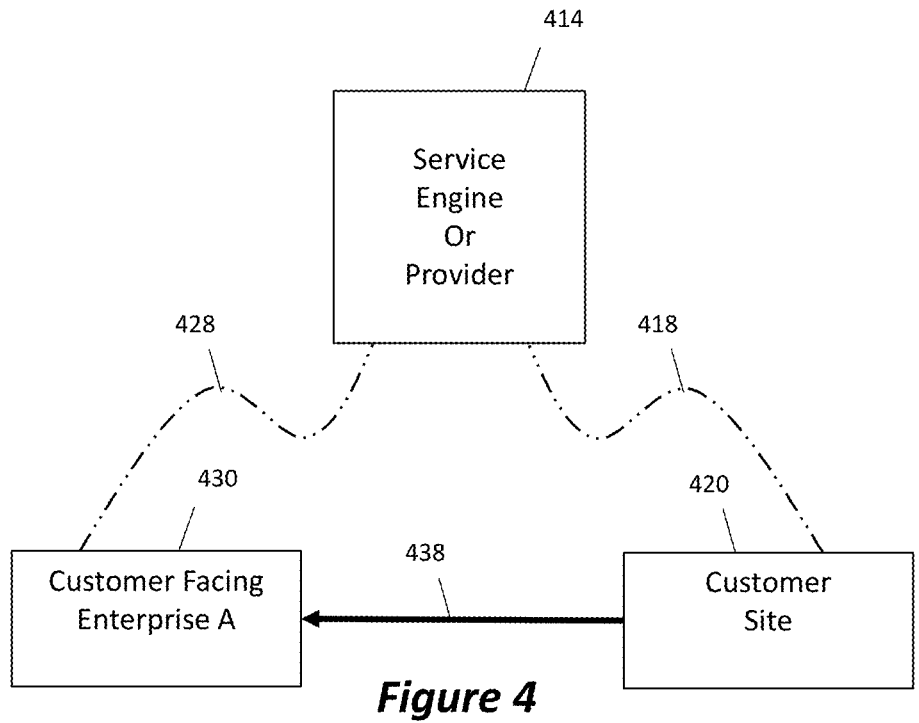
FIG. 4 is a high level diagram of a specific use case implementation.

Referring now to FIG. 4, an example archive service selection is demonstrated. Upon selection of a desired use case tile for archive services, for example "Archive SQL to Google Cloud Coldline," service engine 414 establishes a path 418 to communicate with a customer site 420 including an administrative computer or data center or both. In alternate embodiments, the selected cloud-enabled service may establish a path (not shown) to customer site 420 directly. As illustrated, service engine 414 downloads the computer-executable file to the customer site 420 along path 418 for the customer to invoke. The service engine 414 additionally uses an existing data path 428 or establishes one where no path exists to communicate customer data and service requirements to the cloud-enabled service 430. Among others, when the customer executes the computer-executable file, a data path 438 is established from the customer site 420 and the cloud-enabled service 430. As discussed above, the system and method then provides various services such as a user dashboard to enable the customer to manage the service including attending to billing, arranging for service upgrades, checking status and other administrative activities.

Figure 5:
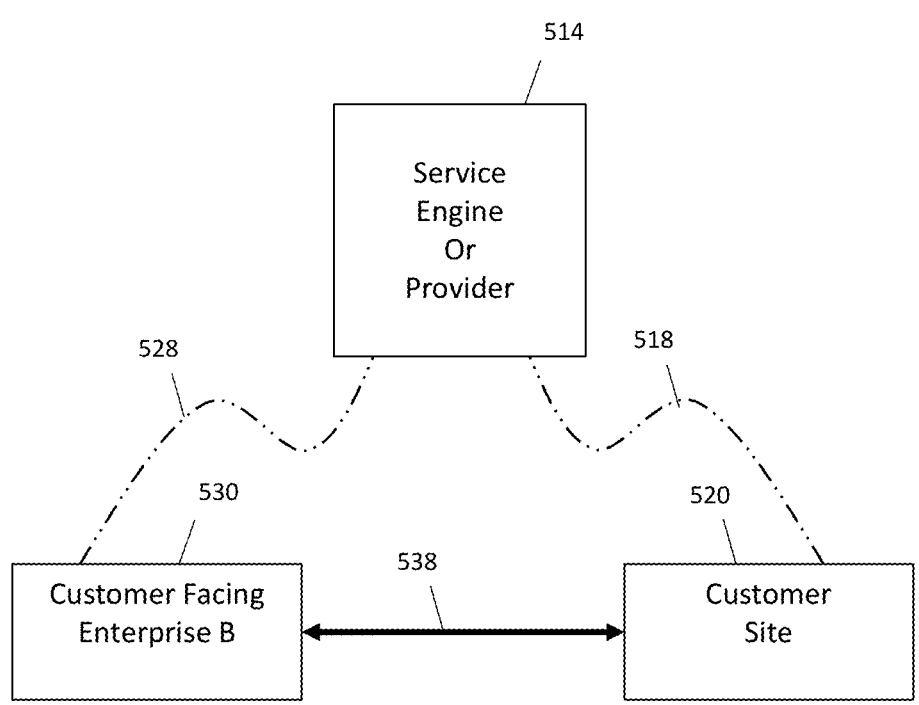
FIG. 5 is a high level diagram of another specific use case implementation

Referring now to FIG. 5, an example back-up and restore service selection is demonstrated. Upon selection of a desired use case tile for back-up and restore services, for example "Back-up Microsoft® Exchange to Microsoft® Azure," service engine 514 establishes a path 518 to communicate with a customer site 520 including an administrative computer, exchange server, data center or some or all. In alternate embodiments, the selected cloud-enabled service may establish a path (not shown) to customer site 520 directly. The service engine 514 downloads the computer-executable file to the customer site 520 for the customer to invoke. The service engine 514 additionally uses an existing data path 528 or establishes one where no path exists to communicate customer data and service requirements to the cloud-enabled service 530. Among others, when the customer executes the computer-executable file, a bi-directional data path 538 is established between the customer site 520 and the cloud-enabled service 530 for back-up and restore services. As discussed above, the system and method then provides various services such as a user dashboard to enable the customer to manage the service including attending to billing, arranging for service upgrades, checking status and other administrative activities.

Figure 6:
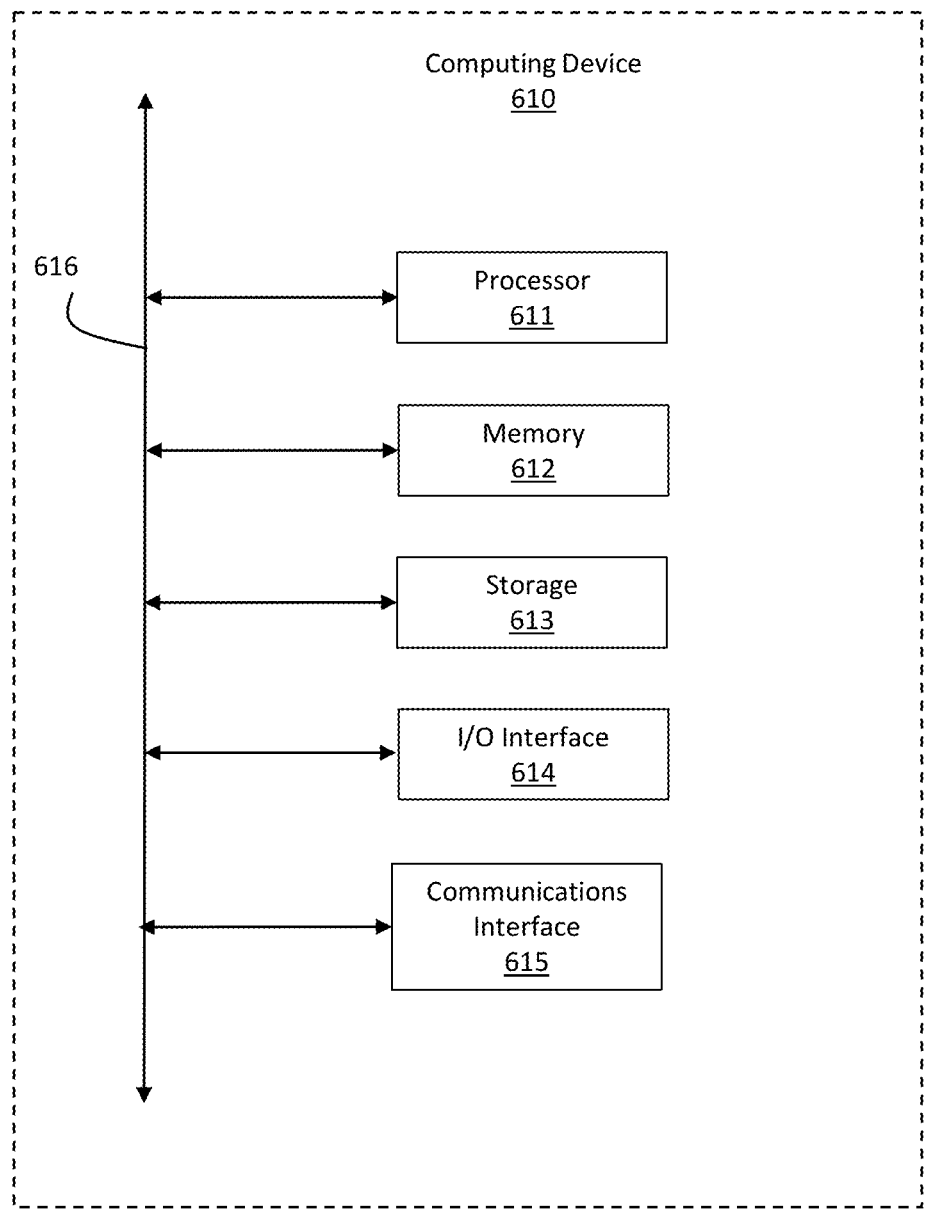
FIG. 6 is a block diagram depicting an example hardware implementation.

Any suitable computing system or group of computing systems can be used to implement the techniques and methods disclosed herein. For example, FIG. 6 is a block diagram depicting one exemplary implementation of such components. A computing device 610 can include a processor 611 that is communicatively coupled to a memory 612 and that executes computer-executable program code and/or accesses information stored in memory 612. The processor 611 may comprise a microprocessor, an application-specific integrated circuit ("ASIC"), a state machine, or other processing device. The processor 611 can include one processing device or more than one processing device. Such a processor can include or may be in communication with a computer-readable medium, including but not limited to memory 612, storing instructions that, when executed by the processor 611, cause the processor to perform the operations described herein.

The memory 612 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 610 executes program code that configures the processor 611 to perform one or more of the operations described above. Specifically, and without limitation, the program code can include code to configure the processor as a service engine 104, 200, 414, 514, and an orchestration engine 128. The program code may be resident in the memory 612 or any suitable computer-readable medium and may be executed by the processor 611 or any other suitable processor. In some embodiments, modules can be resident in the memory 612. In additional or alternative embodiments, one or more modules can be resident in a memory that is accessible via a data network, such as a memory accessible to a cloud service.

The computing device 610 may also comprise a number of external or internal devices such as input or output devices. For example, the computing device is shown with an input/output ("I/O") interface 614 that can receive input from input devices or provide output to output devices. A communication interface 615 may also be included in the computing device 610 and can include any device or group of devices suitable for establishing a wired or wireless data connection to one or more data networks. Non-limiting examples of the communication interface 615 include an Ethernet network adapter, a modem, and/or the like. The computing device 610 can transmit messages as electronic or optical signals via the interface 614. A bus 616 can also be included to communicatively couple one or more components of the computing device 610.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for permitting users to select and implement data management services, the method comprising:
    displaying a plurality of user selectable icons representing a plurality of third party cloud-enabled data management services on a user interface representation of a cloud marketplace;
    receiving a user selection from the user interface representation of the cloud marketplace, where the user selection includes a use case specific instruction relating to the user selection representing a particular one of the plurality of third party cloud-enabled data management services;
    obtaining service set up data from the user where the data corresponds to particular aspects of the user selection including location of a user provided location data for a data source for which the particular one of the third party cloud-enabled data management service is desired; and
    based on the received user selection and the service set up data, creating a computer-executable file for a user identified computer,
    downloading the computer-executable file on a first data path to the user identified computer;
    where the computer executable file, upon execution on the user identified computer, establishes a second data path between the location of the user identified data source for which the particular cloud-enabled data management service is desired and the third party cloud-enabled service corresponding to the user selection.

2. The method as set forth in claim 1, further comprising invoking security credentials to permit delivery of the computer executable file, where the computer executable file implements a virtual machine to reside and execute on the user identified computer.

3. The method as set forth in claim 2, further comprising revoking the security credentials to the user identified computer following implementation of the virtual machine.

4. The method as set forth in claim 1, further comprising invoking security credentials to permit delivery of the computer executable file, where the computer executable file implements an appliance with authority to deliver and install a network trusted package to execute on the user identified computer.

5. The method as set forth in claim 4, further comprising revoking the security credentials to the user identified computer following installation of the network trusted package.

6. A computer-based system for permitting users to select and implement data management services, the system comprising:
    a means for displaying a plurality of user selectable icons representing a plurality of third party cloud-enabled data management services on a user interface representation of a third party cloud marketplace;
    a means for receiving a user selection from the user interface representation of the cloud marketplace, where the user selection includes a use case specific instruction relating to the user selection representing a particular one of the plurality of third party cloud-enabled data management services;
    a means for obtaining service set up data from the user where the data corresponds to particular aspects of the user selection including location of a user provided data source for which the particular one of the third party cloud-enabled data management service is desired; and
    a means for creating a computer-executable file for a user identified computer based on the received user selection and the service set up data,
    a means for downloading the computer-executable file on a first data path to the user identified computer;
    where the computer executable file, upon execution on the user identified computer, establishes a second data path between the location of the user provided data source for which the particular cloud-enabled data management service is desired and the third party cloud-enabled service corresponding to the user selection.

7. The computer-based system as set forth in claim 6, further comprising means for invoking security credentials to permit delivery of the computer executable file, where the computer executable file comprises software to reside and execute on the user identified computer, where the software enables the particular one of the plurality of cloud-enabled services.

8. The computer-based system as set forth in claim 7, further comprising means for revoking the security credentials to the user identified computer following delivery of the computer-executable file.

9. The computer-based system as set forth in claim 6, further comprising means for invoking security credentials to permit delivery of the computer executable file, where the computer executable file implements an appliance with authority to deliver and install a network trusted package to execute on the user identified computer.

10. The computer-based system as set forth in claim 9, further comprising means for revoking the security credentials to the user identified computer following installation of the network trusted package.

11. A non-transitory computer-readable medium comprising instructions for causing a computing device to perform operations comprising:
    displaying a plurality of user selectable icons representing a plurality of third party cloud-enabled data management services on a user interface representation of a cloud marketplace;
    receiving a user selection from the user interface representation of the cloud marketplace, where the user selection includes a use case specific instruction relating to the user selection representing a particular one of the plurality of third party cloud-enabled data management services;

obtaining service set up data from the user where the data corresponds to particular aspects of the user selection including location of a user provided data source for which the particular one of the third party cloud-enabled data management service is desired; and based on the received user selection and the service set up data, creating a computer-executable file for a user identified computer, downloading the computer-executable file on a first data path to the user identified computer;

where the computer executable file, upon execution on the user identified computer, establishes a second data path between the location of the user provided data source for which the particular cloud-enabled data management service is desired and the third party cloud-enabled service corresponding to the user selection.

12. The non-transitory computer-readable medium as set forth in claim 11, further comprising instructions for causing a computing device to perform operations comprising invoking security credentials to permit delivery of the computer executable file, where the computer executable file implements a virtual machine to reside and execute on the user identified computer.

13. The non-transitory computer-readable medium as set forth in claim 12, further comprising instructions for causing a computing device to perform operations comprising revoking the security credentials to the user identified computer following implementation of the virtual machine.

14. The non-transitory computer-readable medium as set forth in claim 11, further comprising instructions for causing a computing device to perform operations comprising invoking security credentials to permit delivery of the computer executable file, where the computer executable file implements an appliance with authority to deliver and install a network trusted package to execute on the user identified computer.

15. The non-transitory computer-readable medium as set forth in claim 14, further comprising instructions for causing a computing device to perform operations comprising revoking the security credentials to the user identified computer following installation of the network trusted package.

16. The method as set forth in claim 1, where the data management services comprise archiving computer stored data.

17. The method as set forth in claim 1, where the data management services comprise backing up computer stored data.

* * * * *